H. L. HEATON.
Lemon-Squeezer and Shaker Combined.
No. 204,325. Patented May 28, 1878.
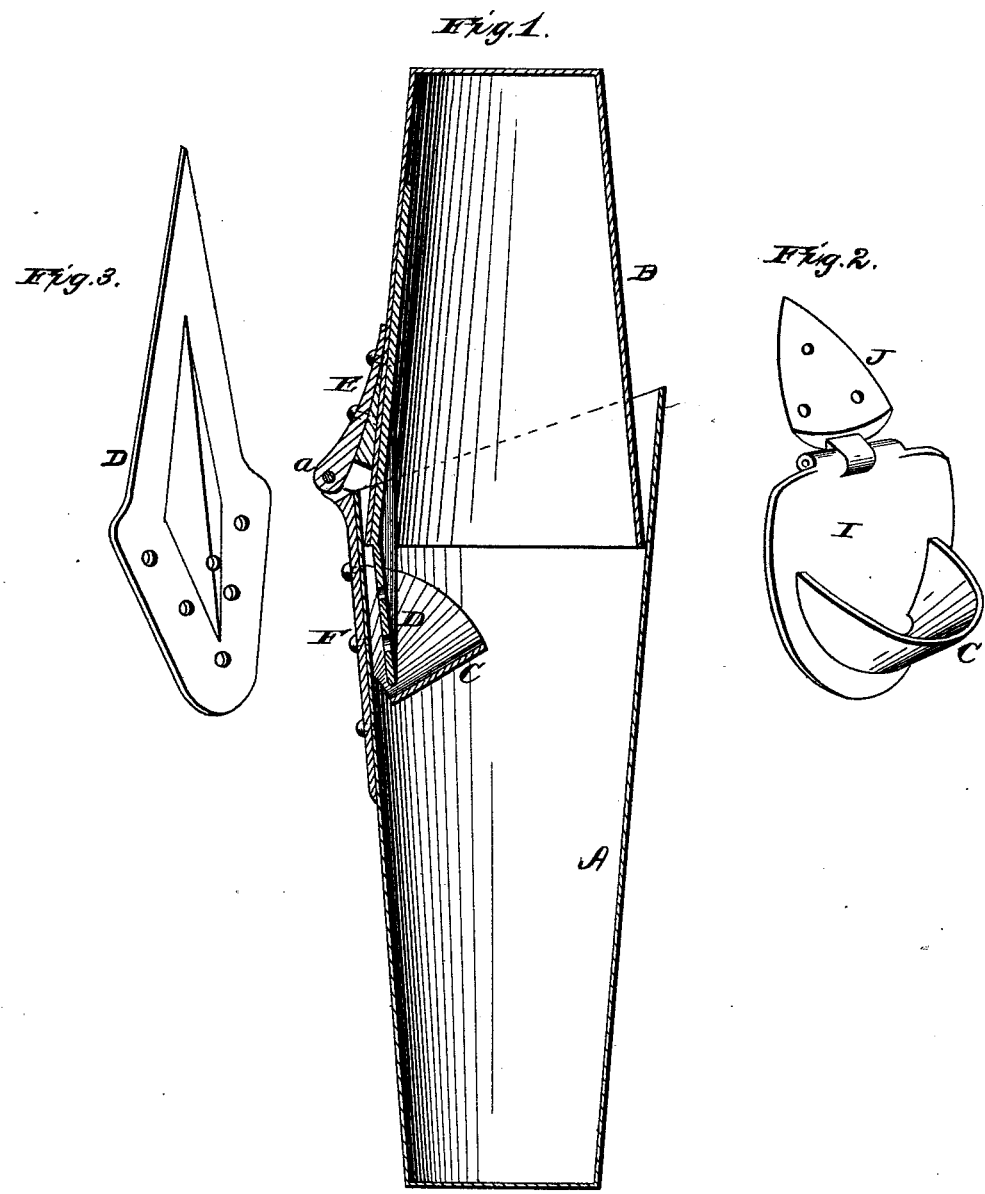

UNITED STATES PATENT OFFICE.

HORACE L. HEATON, OF WEST JEFFERSON, OHIO.

IMPROVEMENT IN LEMON-SQUEEZER AND SHAKER COMBINED.

Specification forming part of Letters Patent No. 204,325, dated May 28, 1878; application filed May 15, 1878.

*To all whom it may concern:*

Be it known that I, H. L. HEATON, of West Jefferson, in the county of Madison, and in the State of Ohio, have invented certain new and useful Improvements in Lemon-Squeezer and Shaker Combined; and do hereby declare that the following is a full, clear, and exact description thereof, reference being had to the accompanying drawings, and to the letters of reference marked thereon, making a part of this specification.

The nature of my invention consists in combined shaker and lemon-squeezer, for the mixing of lemonade and other drinks of a mixed character, the peculiarities of which will be hereinafter more particularly described.

To enable those skilled in the art to make and use my invention, I will proceed to describe its construction and operation.

In the accompanying drawings, making part of this specification, Figure 1 represents a longitudinal section of the shaker; and Figs. 2 and 3, detached portions of same, showing lemon cup and squeezer.

In the figures, A represents a cup, which is made of metal, and which is provided with a hinged cup-top, B. The vessel or cup A is provided upon one side, and near its top, with a flaring-mouthed, open-bottomed cup, in which the lemon to be squeezed is placed. This cup C may be secured to the inside of the vessel A, or it may be formed upon a plate, I, as seen, Fig. 2, and said plate properly riveted or secured to the vessel or cup A.

F represents a metal plate secured to the outside of the vessel or cup A. The upper end of this is so formed that it connects with a similar plate upon cup B, the two forming hinges, as seen at *a*, for connecting the two cups A and B together.

The cup B is provided upon its inside with a metallic plate, D, one end of which projects downward, so that when one cup is closed over the other this projecting end will enter the inside cup C, for the purpose of pressing the piece of lemon which is placed in said cup.

The plates E and F are for the purpose of strengthening the two cups A and B, and at the same time for forming hinges, while the plate D is not only for strengthening the upper cup, but at the same time forming a squeezer.

The upper cup B takes the place of the tumbler in the ordinary shaker.

What I claim as new, and desire to patent, is—

1. The combination of two metallic cups, hinged together, and so formed that the mouth of one fits within that of the other, for forming a shaker, as herein set forth.

2. The combination of two hinged metallic cups, as described, one having a lemon-cup, C, and the other a plate, the end of which projects into the cup C, for forming a squeezer and shaker, substantially as set forth.

In testimony that I claim the foregoing I have hereunto set my hand this 4th day of May, 1878.

HORACE L. HEATON.

Witnesses:
 JOHN H. BEALS,
 JAMES MASON.